United States Patent
Verdun et al.

(10) Patent No.: US 6,687,777 B2
(45) Date of Patent: Feb. 3, 2004

(54) APPARATUS AND METHOD OF CONNECTING AND INTERFACING ACTIVE DEVICE COMPONENTS

(75) Inventors: Gary J. Verdun, Belton, TX (US); LaVaughn F. Watts, Jr., Austin, TX (US); Randall Juenger, Belton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/306,469

(22) Filed: Nov. 27, 2002

(65) Prior Publication Data

US 2003/0110337 A1 Jun. 12, 2003

Related U.S. Application Data

(63) Continuation of application No. 08/587,176, filed on Jan. 16, 1996, now Pat. No. 6,493,782.

(51) Int. Cl.$^7$ ................................................ G06F 13/00
(52) U.S. Cl. ........................................ 710/300; 361/686
(58) Field of Search .......................... 710/300–304; 361/686

(56) References Cited

U.S. PATENT DOCUMENTS

| | | | |
|---|---|---|---|
| 5,386,567 A | | 1/1995 | Lien et al. |
| 5,526,493 A | | 6/1996 | Shu |
| 5,598,537 A | | 1/1997 | Swanstrom et al. |
| 5,598,539 A | | 1/1997 | Gephardt et al. |
| 5,598,577 A | * | 1/1997 | Overfield ............... 710/10 |
| 5,604,873 A | * | 2/1997 | Fite et al. ............... 710/302 |
| 5,627,974 A | | 5/1997 | Watts, Jr. |
| 5,632,020 A | | 5/1997 | Gephardt et al. |
| 5,664,118 A | | 9/1997 | Nishigaki et al. |

* cited by examiner

Primary Examiner—Rupal Dharia
(74) Attorney, Agent, or Firm—Ronald O. Neerings; Wade James Brady, III; Frederick J. Telecky, Jr.

(57) ABSTRACT

A method and apparatus of connecting an active computing device (15) to an active peripheral option (20) comprising the steps of making a physical connection (210) between the device (15) and the option (20) wherein the option (20) is communicably linked (44) to one or more peripheral devices (35, 40). A system interrupt signal is generated (240) and detected (250) by the system processor (17) causing all activity along the connection path between the device (15) and the option (20) to be suspended (250).

33 Claims, 3 Drawing Sheets

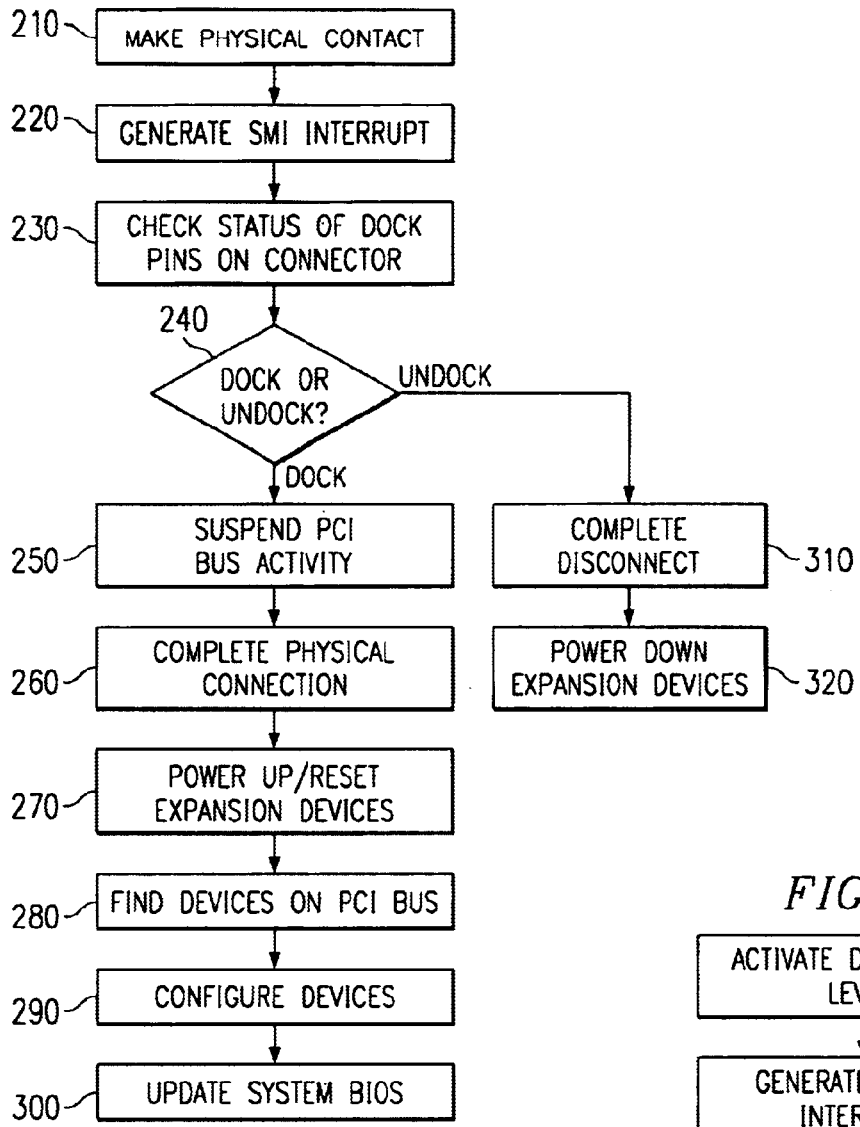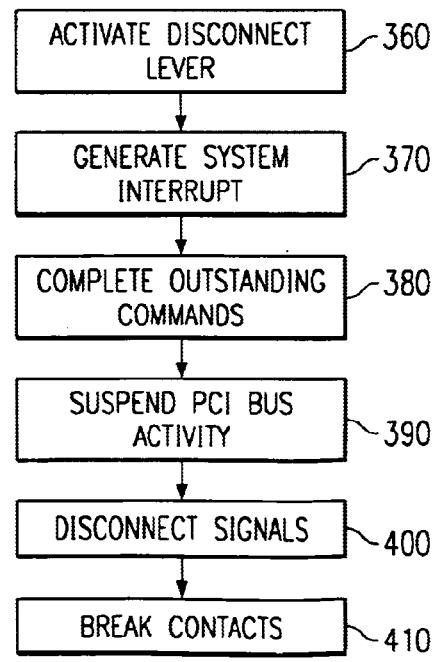

APPARATUS AND METHOD OF CONNECTING AND INTERFACING ACTIVE DEVICE COMPONENTS

This application is a continuation of Ser. No. 08/587,176 filed on Jan. 16, 1996 now U.S. Pat. No. 6,493,782.

TECHNICAL FIELD

The present invention relates in general to a method and device for connecting computing devices and in particular to a method of interfacing two functionally active devices without first requiring a power down cycle of either device.

BACKGROUND OF THE INVENTION

Without limiting the scope of the invention, its background is described in connection with a portable computer system coupled to an expansion base unit for operably linking one or more external peripheral devices to the portable computer system.

The increased demand for portable computer systems, such as laptop and notebook computers, has resulted in a proliferation of peripheral devices and external options designed to increase the functionality and convenience of the portable computer. One such option is commonly referred to as the expansion base or "docking" unit.

In essence, a portable computer system is coupled ("docked") to the docking unit via a connector which consists of pins forming signal paths from the computer to the docking unit. The docking unit, in turn, houses one or more peripheral devices which are communicably linked to the portable computer's microprocessor and other subsystems via the connector. The devices may include peripherals such as a harddisk drive, sound card, video card and others. In this way, a portable computer user can have both the functionality of a desktop computer and the portability of a notebook system.

Many desktop and portable computer systems run internal system configuration and diagnostic programs during the power up stage. Sometimes referred to as the Power-On-Self-Tests ("POST"), these internal program routines are used to verify the functionality of the computer's subsystems such as the microprocessor, keyboard controller, memory systems, I/O ports, attached peripheral devices and others.

Some prior arts docking systems require that both the portable computer and expansion base unit be nonactive (power OFF) during the docking process. Still other prior art systems permit the expansion base to be ON but require the portable computer system power to be OFF. In this way the portable system internal configuration setup system (such as POST) can update the system Basic Input Output System ("BIOS") by determining what devices are available via the expansion base unit and making the appropriate port assignments and interrupt signal designations.

Yet another aspect of known prior art system is the use of dedicated buffers on the expansion base connector to maintain the expansion bus in a "dead" nonoperative state and thus effectively disconnect the portable computer processor from the expansion base peripheral devices during docking. With known prior art system power is applied to the portable system only after it has been connected to the expansion base unit. Moreover, the use of dedicated buffers increases the amount of real estate on the system printed circuit board and increases overall system cost.

SUMMARY OF THE INVENTION

It is herein recognized that a need exists for a method or device to connect the portable system to the expansion base unit that did not require the portable system power to be turned OFF and the use of dedicated buffers on the expansion base connector. The connect and disconnect of an "active" operational portable computer system to and from an "active" expansion base unit (sometimes referred to as "hot docking") presents several difficulties. First, the risk of device latch up, which often leads to a peripheral device, processor or both, "freezing up" and ceasing operation is present. Device latch up occurs when a device pulls excessive current through the expansion base connector due to sudden and unexpected signals and power levels. While latch up may destroy or damage a device, the use of protection circuitry in most modern day components can protect the device but still render it inoperable until the user cycles power by turning the system OFF and then ON.

Other known problems with interfacing an active portable to an active expansion base unit are signal glitching and cycle corruption. Timing differences between the signals appearing at the output of the expansion base connector and the input of the device interface contribute to such signal problems.

Moreover, the physical contact at the expansion base connector may cause signal breaks which are interpreted as false conditions by the system processor. The end result may be an incorrect command sent to the system controller, loss data segments, process interrupt sequences, loss of video or system memory, slow system performance or system freeze as well as other faulty conditions.

Accordingly, it is one object of the present invention to provide a method and device of interfacing active device components without effecting overall system performance or function. This is accomplished by generating a connect or disconnect interrupt signal which is intercepted by the system processor to cause system activity to be suspended during for a period of time while the connection is completed.

Another object of the present invention is to provide a method and device of interfacing operative devices that accounts for differences in device power states. A power state defines a device's power-on/power-off status at the time of connection or disconnection. In this regard, the invention enables nonintrusive connect and disconnect in all possible power state configurations.

Yet another object of the present invention is to provide a device interface method and device that determines the status of a device connection. Dedicated signals on the expansion base connector are used to determine if a docking or undocking event is about to occur. A set of contacts on the expansion base unit generates an interrupt to the portable computer system processor when docking is occurring which suspends activity for a predetermined period of time enabling signal synchronization between the portable system processor and the expansion base unit. Device latch up is avoided by using make-first break-last type contacts at the expansion base unit interface ensuring that a complete connection is made for power prior to signal mating.

Still another object of the present invention is to provide a method of disconnecting operable devices that minimizes device freeze up during undocking of the portable computer system from the expansion base unit. A lever maintained on the expansion base platform actuates the undocking procedure and initiates an interrupt to the processor. All outstanding commands and system requests are terminated prior to the physical disconnect from the expansion base unit.

The expansion base unit is programmed to power-down peripherals maintaining them in a dormant state until subsequent docking. The portable computer Basis Input/Output System ("BIOS") communicates with each active device via the Peripheral Component Interface ("PCI") and reconfigures each device as part of the interface process in order to set each peripheral in its native power-up operational mode.

Disclosed is a method and device of connecting an active computing device to an active peripheral option comprising the steps of making a physical connection between the device and the option wherein the option is communicably linked to one or more peripheral devices. A system interrupt signal is generated to suspend all activity along the signal path between the device and the option.

For a more complete understanding of the present invention, including its features and advantages, reference is now made to the following detailed description, taken in conjunction with the accompanying drawings.

BRIEF DESCRIPTION OF THE DRAWINGS

In the drawings:

FIG. 3 is flow diagram illustrating the docking process in accordance with the preferred embodiment of the invention; and FIG. 4 is flow diagram illustrating the undocking process in accordance with the preferred embodiment of the invention.

DETAILED DESCRIPTION OF THE PREFERRED EMBODIMENT

Figure 1:
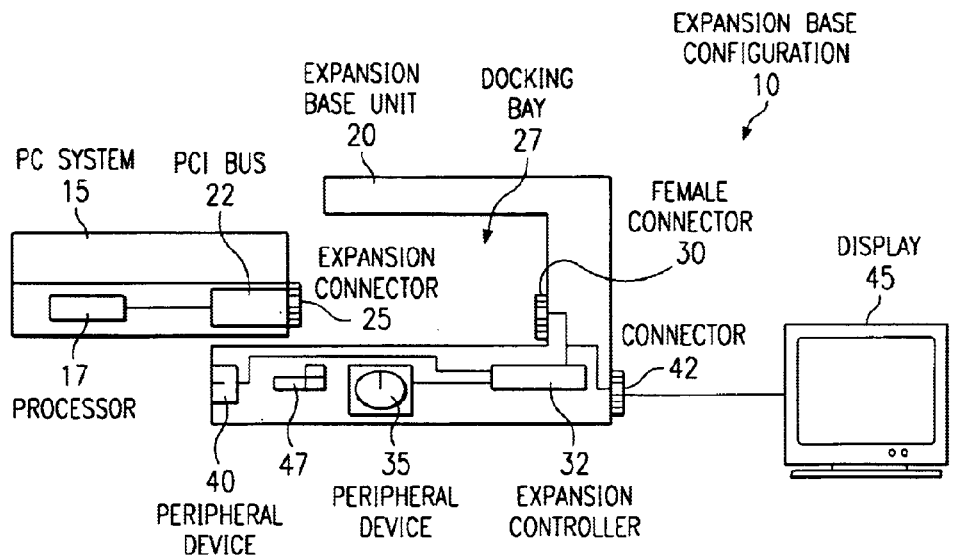
FIG. 1 is a sketch diagram of a portable computer coupled to an expansion base unit.

In reference to FIG. 1, an expansion base configuration 10 of a portable computer system 15 and expansion base unit 20 is shown. The portable computer system 15 fits in the docking bay 27 areas of the expansion base unit 20. Expansion base unit 20 illustrates one of the available docking stations on the market today having one or more expansion slots for holding one or more peripheral devices 35 and 40 such as a hard disk drive, sound card, CD drive and other peripheral devices. A display means 45 may be externally coupled to the expansion base unit 20 at connector 42.

In one embodiment, devices 35 and 40 communicate with components in the portable computer system 15 using the Peripheral Component Interface ("PCI") standard along the PCI bus 22. In this configuration, processor 17 is the master PCI device on PCI bus 22. The physical level interface between portable computer 15 and expansion base unit 20 is achieved by joining expansion male connect 25 with expansion female connect 30.

System processor 17 communicates with devices 35 and 40 in expansion base unit 20 via PCI bus 22 using the PCI protocol (as originally proposed by the Intel Technical forum in December 1991 including subsequent revisions). A host bridge 19 (not shown) within portable computer 15 is the interface between processor 17 and PCI bus 22. PCI bus 22 has a signal pathway (at least 47 pins for a PCI target device and 49 pins for a PCI master) to devices 35 and 40 in expansion base unit 20 via male connect 25 and female connect 30.

It should be understood the male connect 25 and female connect 30 are joined to form the expansion base connector to expansion base unit 20 having a plurality of signal pathways for transmission of data and power signals between the portable computer system 15 and expansion base unit 20. In the preferred embodiment, 160 conductive pins are used to form the signal pathways and physical level interface between portable computer system 15 and expansion base unit 20. In table 1, a pin-by-pin signal designation is shown for one possible arrangement of expansion signals, although other arrangements are possible and within the scope of the invention:

TABLE 1

Expansion base connector signal designations

| Pin # | Signal Name |
|---|---|
| 1 | GND |
| 2 | TCK |
| 3 | TMS |
| 4 | GND |
| 5 | MIDITXD |
| 6 | MIDIRXD |
| 7 | GND |
| 8 | ACK64# |
| 9 | REQ64# |
| 10 | GND |
| 11 | SIRQDAT |
| 12 | SDACK |
| 13 | GND |
| 14 | BAT |
| 15 | BAT |
| 16 | MICGND |
| 17 | DIN_CLK |
| 18 | KBDDAT |
| 19 | GND |
| 20 | LINGND |
| 21 | TRST |
| 22 | GND |
| 23 | TDO |
| 24 | TDI |
| 25 | GND |
| 26 | RST# |
| 27 | LOCK# |
| 28 | GND |
| 29 | Unused |
| 30 | SDREQ |
| 31 | GND |
| 32 | SMUXSYNC |
| 33 | BAT |
| 34 | GND |
| 35 | LMICIN |
| 36 | RMICIN |
| 37 | DIN_DAT |
| 38 | KBDCLK |
| 39 | RTLNIN |
| 40 | LFLNIN |
| 41 | INTA# |
| 42 | INTB# |
| 43 | INTD# |
| 44 | REQ1# |
| 45 | GND |
| 46 | AD(31) |
| 47 | AD (29) |
| 48 | GND |
| 49 | AD (25) |
| 50 | C/BE# (3) |
| 51 | GND |
| 52 | AD (20) |
| 53 | AD (18) |
| 54 | GND |
| 55 | C/BE# (2) |
| 56 | IRDY# |
| 57 | GND |
| 58 | PERR# |
| 59 | SBO# |
| 60 | GND |
| 61 | AD (15) |
| 62 | AD (13) |
| 63 | GND |
| 64 | AD (09) |

TABLE 1-continued

Expansion base connector signal designations

| Pin # | Signal Name |
|---|---|
| 65 | C/BE# (0) |
| 66 | GND |
| 67 | AD (04) |
| 68 | AD (02) |
| 69 | GND |
| 70 | FCP (01) |
| 71 | FCP (03) |
| 72 | GND |
| 73 | FCP (07) |
| 74 | FCESYNC- |
| 75 | GND |
| 76 | CPUON- |
| 77 | PWR_SWOF- |
| 78 | LFLNOUT |
| 79 | LNOUTGND |
| 80 | RTLNOUT |
| 81 | EXT-SMI |
| 82 | GND |
| 83 | PCICLK |
| 84 | GND |
| 85 | REQ0# |
| 86 | GND |
| 87 | AD (30) |
| 88 | AD (27) |
| 89 | GND |
| 90 | AD (24) |
| 91 | AD (22) |
| 92 | GND |
| 93 | AD (19) |
| 94 | GND |
| 95 | FRAME# |
| 96 | GND |
| 97 | DEVSEL# |
| 98 | GND |
| 99 | SDONE |
| 100 | PAR |
| 101 | GND |
| 102 | AD (14) |
| 103 | AD (11) |
| 104 | GND |
| 105 | AD (08) |
| 106 | AD (06) |
| 107 | GND |
| 108 | AD (03) |
| 109 | AD (00) |
| 110 | GND |
| 111 | FCP (02) |
| 112 | FCP (05) |
| 113 | GND |
| 114 | FCBLANK- |
| 115 | VAFC |
| 116 | GND |
| 117 | FCEVIDEO |
| 118 | GND |
| 119 | GND |
| 120 | DOCK- |
| 121 | BAT |
| 122 | VCC |
| 123 | GND |
| 124 | INTC# |
| 125 | GNT1# |
| 126 | GNT0# |
| 127 | GND |
| 128 | AD (28) |
| 129 | AD (26) |
| 130 | GND |
| 131 | AD (23) |
| 132 | AD (21) |
| 133 | GND |
| 134 | AD (17) |
| 135 | AD (16) |
| 136 | GND |
| 137 | TRDY# |
| 138 | STOP# |
| 139 | GND |
| 140 | SERR# |
| 141 | C/BE (1) |
| 142 | GND |
| 143 | AD (12) |
| 144 | AD (10) |
| 145 | GND |
| 146 | AD (07) |
| 147 | AD (05) |
| 148 | GND |
| 149 | AD (01) |
| 150 | FCP (00) |
| 151 | GND |
| 152 | FCP (04) |
| 153 | FCP (06) |
| 154 | GND |
| 155 | OVRW |
| 156 | VINS |
| 157 | GND |
| 158 | FCVCLK |
| 159 | GND |
| 160 | VCC |

In the preferred embodiment, a set of Make-First Break-Last ("MFBL") contacts on the portable computer system 15 side of configuration 10 are used permitting physical contact between male connect 25 and female connect 30 prior to completing the signal circuit pathways.

Also shown is expansion controller 32 on the expansion base unit 20 side of configuration 10. Expansion controller 32 is used to control various devices 35, 40 including power on and power off, and is communicably linked to female connect 30 for detection of docking and undocking activity with portable computer system 15.

In operation, the expansion controller 32 detects the presence of portable computer system 15 when docked in dock bay 27 area of expansion base unit 20. In this regard, dedicated docking signals on the expansion base connector are sensed by expansion controller 32 when male connect 25 makes physical contact with female connect 30.

In the preferred embodiment, expansion base controller 32 is programmed to power up and power down devices 35 and 40 corresponding to docked and undocked conditions, respectively. Expansion base controller 32 remains dormant while not docked in order to conserve power. Likewise, devices 35 and 40 are turned off while not docked to conserve power.

A docking condition corresponds to male connect 25 making physical contact with female connect 30. Docking signals on the expansion base connector are detected by the expansion base controller 32 when differences in signals swings are sensed initiating the docking process. Expansion base controller 32, in turn, powers up devices 35 and 40 within expansion base unit 20 during the docking process.

Also during docking, the action of the MFBL contacts is sensed by processor 17 as an SMI interrupt signal. The presence of an SMI interrupt signal causes the system processor 17 to suspend or cease any system activity on the bus 22 for a predetermined amount of time. Thus, any outstanding device requests, program instructions or application routines or commands are suspended by processor 17 to provide sufficient amount of time to complete the physical connection between the portable computer system 15 and the expansion base unit 20. Processor 17 attempts to determine the presence of a docking condition at the expansion base connector. As a master PCI device, processor 17 can maintain control of the PCI bus 22 for any amount of time during the docking process.

Figure 2A:
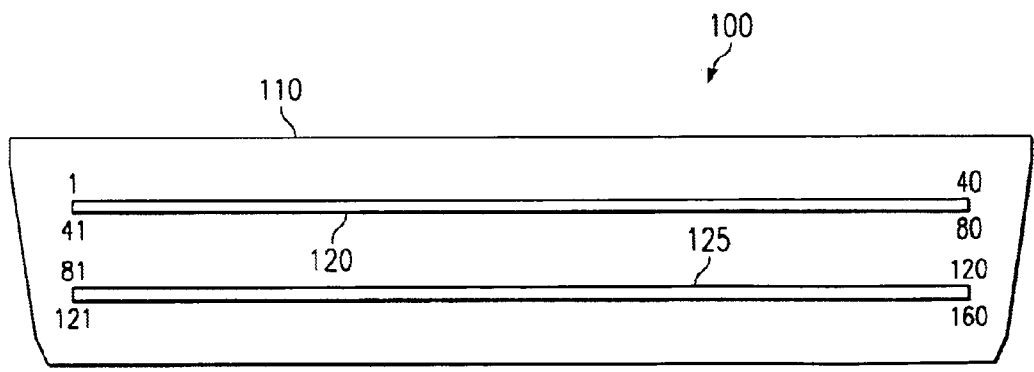
FIG. 2 is a detailed schematic diagram illustrating the expansion base connector interface in accordance with the preferred embodiment of the invention.
Figure 2B:
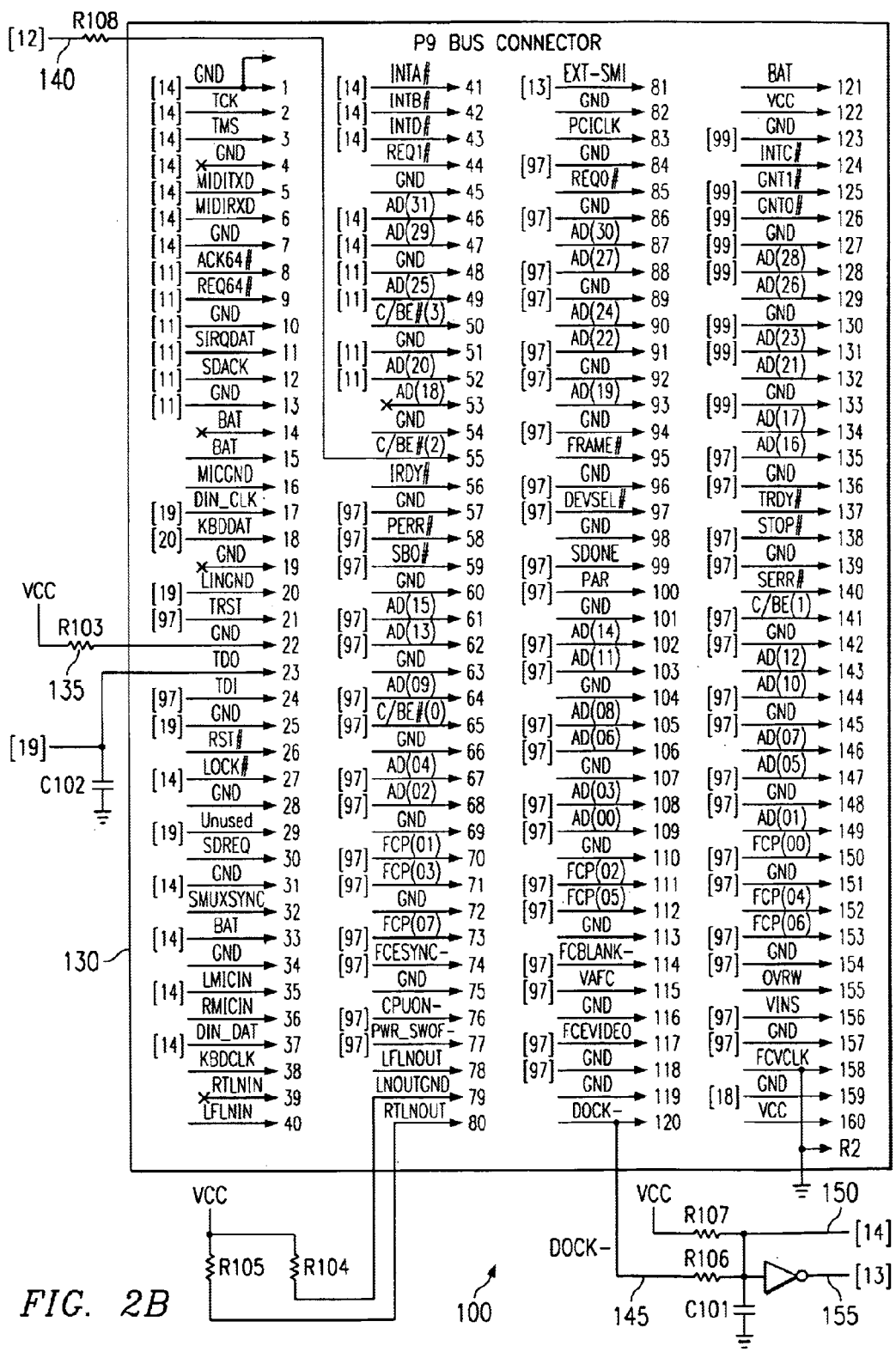

In reference to FIG. 2, the preferred embodiment of the expansion base connector, denoted generally as 100, is shown. Connector 100 has a physical connector harness 110 which contains pin contacts 120 and 125. As shown, pin contacts 120 and 125 consist of individual pins numbered 1–40, 41–80, 81–120 and 121–160 for a total of 160 separate signal pathways.

The signal pathways are collectively designated in signal map 130 wherein each pin is denoted as an expansion signal similar to those shown in Table 1. Among the expansion signals is the power supply signal 135 (VCC), PCI clock signal 140 (PCICLKBS), dock signal 145 (DOCK-) and expansion unit signals 150 and 155 (EXUNIT-, EXUNIT).

Turning now to FIG. 3, a flow diagram of the docking process 200 is shown. Process 200 begins with a physical contact 210 of the male connect 25 and female connect 30 of the expansion base connector. Contact of the MFBL lines 210 signals the beginning of the process 200 to the expansion base controller 32 and system processor 17. Hardware in the computer 15 generates the SMI interrupt signal and the processor checks the status of the docking process 230 to determine whether the portable computer 15 is being-docked or undocked. In essence, dedicated signals on the expansion base connector indicate the presence of docking by pulling a pin low or high. The processor then detects the signal state at the expansion base-connector.

Where docking is occurring, PCI bus activity is suspended 250 for a predetermined amount of time. In one embodiment, PCI bus activity is suspended for 40 msec permitting the completion of the docking process and interface with the expansion base unit 20. It should be understood that PCI bus 22 activity can be suspended by any amount of time without departing from the true scope and spirit of the invention.

Once a complete connection is obtained 260, the expansion base controller 32 performs a device reset 270 wherein all expansion devices are powered up to normal operable conditions. Next, the system processor 17 finds the available PCI devices 280 such as 35 and 40 which are active via the PCI bus 22. Step 280 is necessary for system configuration purposes in the portable computer system 15 BIOS.

All devices found on the PCI bus 280 are configured 290 by assigning port and interrupt designations the BIOS registers of the portable computer system 15 memory space. Step 290 place each device into its native operational mode, such as when the device is initially powered-up, to permit communications with the portable computer system 15 using the assignned port and interrupt designations. Process terminates wherein the system resource configuration and system BIOS are reconfigured 300 to reflect the new designations.

An undock condition 230 proceeds to completing the disconnect 310 between the male connect 25 and the female connect 30. An undock condition is detected by the expansion base controller 32, which cause a power down of the expansion base devices 320 in order to conserve power and prepare for future docking. The computer 15 system BIOS and SMI interrupt code suspends the PCI bus activity for a predetermined amount of time. In one embodiment, the PCI dock pin on the expansion base connector is set so the processor can see the MFBL contacts disconnect. BIOS will then re-enumerate the PCI bus and report new system resource condition to the operating system if it can handle dynamic resource definitions or perform a system reboot. Should the system be able to handle dynamic system definitions, the operating system can unload drivers as required.

The following program listing is one implementation of a routine for handling the system BIOS functions described above:

The process 200 for docking active devices such as a portable notebook computer 15 and an expansion option unit 20 has application in four (4) possible case scenarios:

| Possible Case | Notebook (15) Power State | Option (20) Power State |
| --- | --- | --- |
| (1) | OFF | OFF |
| (2) | OFF | ON |
| (3) | ON | OFF |
| (4) | ON | ON |

Case (1): Notebook OFF/Option OFF

This configuration presents no problems if it can be assured that the two devices 15, 20 are indeed off.

Case (2): Notebook OFF/Option ON

This scenario is of particular interest for expansion base units 20 with automatic style loading mechanisms where the unit 20 power is ON at the time of plugging the two systems 15, 20 together. The power to the bus connector 25, 30 signals can either be ON or OFF at the time of connector 25, 30 engagement.

With some connector 25, 30 types it may take a minimum of 30 milliseconds to engage any signals after the MFBL contact has engaged in the docking station 20. Thus, in the 30 msec it takes between MFBL engagement and other signal engagement, it is necessary to either turn the power ON in the portable computer system 15 or turn power OFF in the expansion base unit 20.

Turning the power ON in the computer 15 takes several hundred milliseconds making it necessary to delay the remainder of the plug operation until it is complete. Thus it is preferable to first turn the expansion base unit 20 OFF, complete the plug sequence and then turn the entire system 15, 20 ON together.

A short delay may be required during the plug sequence to give the power supply time to shut down outputs on the expansion side. This could be provided by slowing the plug operation to cause a longer delay between MFBL and signal engagement.

Case (3): Notebook ON/Option OFF

In this scenario the expansion power to the PCI bus 22 devices at least should be turned ON within the time between MFBL and signal contacts mating (30 ms for example). The expansion base units 20 can initially take power from the portable computer system 15 via the expansion base connector MFBL contacts or assure the power supplies obtain safe levels in this time period.

Case (4): Notebook ON/Option ON

This is the normal and desired form of a hot docking operation between a portable computer system 15 and an expansion base unit 20 with externally powered options. Where an expansion base unit 20 who is partitioning data from the portable computer system 15 output signal 25 to an external video controller via the PCI bus 22 the connection of the two devices 15, 20 in their active ON state may be technically challenging.

For example, plugging address/data lines and parity check lines simultaneously (actually in two staggered rows), is likely to result in data errors. It is necessary to suspend activity or the PCI bus 22 while the plug operation is occurring.

Since the advent of 386SL and later processors, a System Management Interrupt signal is provided. The processor 17 is therefore programmed to detect a plug/unplug event on the connector 25, 30 through a set of MFBL contacts and a single MLBF (make last break first) contact in the connector 25, 30. The system 15 will then have the amount of time required to plug/unplug the connector the distance between the MFBL/MLBF contacts and the nearest row of signal contacts to shutdown the PCI bus 22. In the preferred embodiment, PCI bus 22 activity is suspended until all operations in the portable computer system are complete (approx. 100 msec). This prevents applications from attempting to communicate with the PCI devices while the PCI bus 22 is being connected or disconnected.

The time it takes to travel the 0.030 inches between MFBL and the first row of contacts in some connectors (25, 30) is approximately 0.005 msec. Other travel times are also envisioned. In any case, it is estimated that the lever terminates the connection between the portable computer system 15 and the expansion base unit 20 is thrown is approximately 0.3 ms.

During connection time the portable computer system 15 will travel about 1.5 inches which yields a linear velocity of 0.222 inches per second and a time to travel 0.03 inches of 6.7 msec which we round down to 5 msec. Thus, in the preferred embodiment it is desirable to get a complete shutdown in under 2 msec. Event signaling for plug and unplug operations will depend on the availability of MFBL and MLBF contacts in the connector 25, 30.

4(a): MFBL and MLBF Contacts Available

Dedicated hardware in the notebook (15) and option (20) generate interrupts to the processor due to signal status changes on one or more MFBL contacts. The interrupt signal may also on a MFBL contact so the act of connecting can generate the interrupt signal prior to the signal contacts being mated.

4(b): No MLBF Contacts Available

In other embodiments, no MLBF contacts are used and the unplug event will have to be detected through something other than a contact break condition. The expansion base unit (20) can handle this with the expansion base controller (32). Normally, this is the device (32) which performs the undock operation in motorized VCR style docks. For hand plug/unplug options it is only possible if the plug/unplug event is detected through a lever actuated plug/unplug operation or sensing physical proximity to the notebook (15). Thus a system interrupt signal is generated in sufficient time for the notebook (15) to handle PCI shutdown prior to any signal contacts unmating.

An interrupt service routine checks the status of the appropriate dock/undock related signals on the expansion base connector (25, 30) and performs a suspend of any PCI bus (22) activity until the dock/undock operation is completed. Next, control is passed to the system BIOS in order to have the system resource configuration reconfigured according to the existing device peripherals.

Reference is now made to FIG. 4 which illustrates, in flow chart form, the undocking process, denoted generally as numeral 350, in accordance with the preferred embodiment of the invention. A mechanical disconnect, such as a button or lever, on the expansion base unit 20, is depressed or activated 360 by the user to initiate the undocking process 350 and generates a system interrupt.

Step 360 permits the system processor 17 to complete current or outstanding processing tasks 370 prior to disconnect from the expansion base unit 20 or peripheral devices 35, 40. In this way, an outstanding request or instruction to peripheral devices 35, 40 can be satisfied. In any case, should the user disconnect in a disruptive manner (by extracting the personal computer 15 from the expansion base unit 20 prematurely), individual device drivers will timeout to ensure no system 15 hangup or freeze.

The undocking process 350 continues to generate a system interrupt signal 380 which is detected by the system processor 17 to inform the portable computer system 15 that an undocking sequence is about to take place. As with docking, the processor 17 can obtain the PCI bus 22 upon interrupt 380 and maintain control for a predetermined amount of time while the physical disconnect is completed.

In the preferred embodiment, the physical disconnect consists of first breaking the signal contacts 400 between the peripheral devices 35, 40 and the PCI bus 22 during the time PCI bus 22 activity is suspended 390. Second, the MFBL contacts break 410 at the male connect 25 and female connect 30 resulting in a complete separation of the portable computer system 15 from the expansion base unit 20. It should be understood that, the disconnect sequence 350 may be accomplished manually by a user or automatically by a motorized undocking means, without departing from the true scope of the invention.

"Processor" or "microprocessor" in some contexts is used to mean that a microprocessor is being used on the portable system board but may also mean that a memory block (RAM cache, DRAM, flash memory and the like) coprocessor subsystem and the like is being used. The usage herein is that terms can also be synonymous and refer to equivalent things. The phrase "circuitry" comprehends ASIC (Application Specific Integrated Circuits), PAL (Programmable Array Logic), PLA (Programmable Logic Array), decoders, memories, non-software based processors, or other circuitry, or digital commuters including microprocessors and microcomputers of any architecture, or combinations thereof. Words of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

```
    RetrySmiLoop:

in    al,0e1h
         mov   ah,al
;
;5.07.01 Test for power switch turning off - timing issue
;6-02095vw
         test  ah,40h              ;Check for AC/PowerSwitch request
         jz    PPLatch              ;Process Powerswitch : bit = 0 test  ah,8                ;Check for Suspend Key
         jnz   PSKey                ;Process Suspend Key : bit =1
         test  ah,4                ;Check Stby Key
         jnz   PStbyKey             ;Process Stby Key : bit =1
         test  ah,2                ;Check Closed Cover latch
         jz    PCLatch              ;Process closed cover latch : bit =1
         test  ah,1                ;Check low battery alarm
         jz    PBLatch              ;Process low battery alarm : bit =0
         test  ah,20h              ;Check Dock/Undock Request
```

```
                jnz     PDLatch    ;[3-11-95vw];   ;Process Dock/Undock Request : bit =0
                test    ah,40h                    ;Check for AC/PowerSwitch request
                jz      PPLatch                   ;Process Powerswitch : bit = 0
                test    ah,10h                    ;Check for EZ-dock com request
                jz      PELatch                   ;Process EZ-Dock com : bit =1
                                                  ;No more request, just in case,
                in      al,0e0h                   ;Interrupt accept Mask
                out     0e1h,al                   ;clr all since we should not be here.
NoActionKey:
                mov     ax, 0107dh                ; Clear status 3-11-95vw Using EXTSMI0
                call    CfgClearBits              ; 3-7-95vw
                RET                               ;Finished here!
;
;       Process routines
;
PSKey:                                            ;Suspend Key
                                                  ;ah&al=E1h
                mov     al,8                      ;Clr interrupt
                out     0e1h,al                   ;Done
                mov     ax, 0107dh                ; Clear status 3-11-95vw Using EXTSMI0
;3-11-95vw       mov     ax, 0027dh                ; Clear status 3-7-95vw
                call    CfgClearBits              ;3-7-95vw SusLBatAction:
                mov     al,5ch                    ;Get suspend key action needed
                mov     bl,11000000b              ;Get options
SusAction:                                        ;2-8-95vw
                call    CmosReadMask
                cmp     ah,0
                je      NoActionKey               ;Ignore this key
                cmp     ah,2                      ;Stby wanted?
                je      ActionStby                ;Yep
                cmp     ah,1
                je      ActionSus                 ;Suspend action
                jmp     SaveDiskAction            ;Save-to-Disk
PStbyKey:

mov     al,4                      ;Clr interrupt
                out     0e1h,al                   ;Done
                mov     ax, 0107dh                ; Clear status 3-11-95vw Using EXTSMI0
;3-11-95vwmov    ax, 0027dh                       ; Clear status 3-7-95vw
                call    CfgClearBits              ; 3-7-95vw ActionStby:
        TREPORT 088h
;
;       Test for Wav/sound/IR active    ;3-6-95vw
;
;
                mov     al,38h                    ;Value with Sound/IR active
                call    CmosRead                  ;Read it
                test    ah,08h                    ;Sound/IR bit ON = Active
                jnz     NoActionKey               ;Do not compute this time JMP     GlobalStby                ;Do it
ActionSus:
        TREPORT 084h
```

```
;
;       Test for Wav/sound/IR active      ;3-6-95vw
;
;

mov     al,38h                  ;Value with Sound/IR active
        call    CmosRead                ;Read it
        test    ah,08h                  ;Sound/IR bit ON = Active
        jnz     NoActionKey             ;Do not compute this time JMP     GlobalSus               ;Do it
        Public  PCLatch                 ;3-7-95vw
PCLatch:                ;Process closed cover latch : bit =1
        TREPORT 085h
        extrn   Video_Global:near       ;3-8-95vw
        extrn   Video_UnGlobal:near     ;3-8-95vw
;3-8-95vwcall   Video_Global            ;Disable video NOW! 3-8-95vw
;
;       Note: Lowtime 40:6c words
;                     40:6e words push    cx
        mov     cx,7                    ; Number of seconds to delay/3
        extrn   KeyDisable:near
        extrn   KeyEnable:near
        extrn   WaitSecDelay:near StallPCLatch:

call    KeyDisable
        call    WaitSecDelay            ;Wait one second in      al,0e1h                 ; Read the Cover latch & Low Bat
        test    al,2                    ; Still down?
        jnz     PCLatchAbort            ; Nop, abort the saving status test    al,40h
        jz      PPLatch                 ;turn power off call    KeyEnable
        call    WaitSecDelay            ;Wait one second in      al,0e1h                 ; Read the Cover latch & Low Bat
        test    al,2                    ; Still down?
        jnz     PCLatchAbort            ; Nop, abort the saving status test    al,40h
        jz      PPLatch                 ;turn power off
;3-8-95vw       mov     ah,5ah                  ; Read current status
;3-8-95vw       push    bx
;3-8-95vw       call    CfgRead                 ; Get the value
;3-8-95vw       pop     bx
;3-8-95vw       and     ah,20h                  ; Alarms on?
;3-8-95vw       cmp     ah,20h                  ; maybe
;3-8-95vw       jne     CCLBDoit                ; Nop
```

```
            loop    StallPCLatch

CCLBDoit:

in      al,0e1h             ; Read the Cover latch & Low Bat
            test    al,2                ; Still down?
            jnz     PCLatchAbort        ; Nop, abort the saving status test    al,40h
            jz      PPLatch             ;turn power off call    Keydisable pop     cx                  ; Clean Stack off
            mov     al,2
            out     0e1h,al             ; Clear Interrupt - Both!
            mov     al,5ch              ;Get suspend key action needed
            mov     bl,00110000b        ;Get options jmp     SusAction           ; Process based on user 2-8-95vw
Public PCLatchAbort
PCLatchAbort:

Call    KeyEnable mov     ah,5ah              ; Read current status
            call    CfgRead             ; Get the value
            and     ah,20h              ; Alarms on?
            cmp     ah,20h              ; maybe
            jne     PCLatchAb1          ;Nop
            mov     ax,205ah
            call    CfgClearBits        ; clear alarm suspend request
            xor     cx,cx               ; needed ???rjj
            loop    $
            mov     ax,205ah call    CfgSetBits
            xor     cx,cx
            loop    $ PCLatchAb1:                             ;3-7-95vw
;3-8-95vw    call    Video_UnGlobal     ;3-8-95vw Restore video
            pop     cx                  ; Clean Stack off mov     al,2
            out     0e1h,al             ; Clear Interrupt mov     ax, 0047dh          ; Clear status
            call    CfgClearBits jmp     NoActionKey ;
;           We have standby here
```

```
;
PBLatch:                                        ;Process low battery alarm : bit =0
        call    APMBattLowNotify                ; Tell APM
;3-8-95vwcall   Video_Global                    ;Disable video NOW! 3-8-95vw push    cx
        mov     cx,4                            ; Number of seconds to delay/2
StallPBLatch:

call    KeyDisable
        call    WaitSecDelay                    ;Wait one second in      al,0e1h                         ; Read the Cover latch & Low Bat
        test    al,1                            ; Still down?
        jnz     PBLatchAbort                    ; Nop, abort the saving status test    al,40h
        jz      PPLatch                         ;turn power off call    KeyEnable
        call    WaitSecDelay                    ;Wait one second in      al,0e1h                         ; Read the Cover latch & Low Bat
        test    al,1                            ; Still down?
        jnz     PBLatchAbort                    ; Nop, abort the saving status test    al,40h
        jz      PPLatch                         ;turn power off ;3-8-95vw       mov     ah,5ah                  ; Read current status
;3-8-95vw       push    bx
;3-8-95vw       call    CfgRead                 ; Get the value
;3-8-95vw       pop     bx
;3-8-95vw       and     ah,20h                  ; Alarms on?
;3-8-95vw       cmp     ah,20h                  ; maybe
;3-8-95vw       jne     LBDoit                  ; Nop loop    StallPBLatch LBDoit:

in      al,0e1h                         ; Read the Cover latch & Low Bat
        test    al,1                            ; Still down?
        jnz     PBLatchAbort                    ; Nop, abort the saving status test    al,40h
        jz      PPLatch                         ;turn power off call    Keydisable pop     cx                              ; Clean Stack off
        mov     al,1
        out     0e1h,al                         ; Clear Interrupt - Both!
```

```
            mov     al,5ch                  ;Get suspend key action needed
            mov     bl,00110000b            ;Get options jmp     SusAction               ; Process based on user 2-8-95vw
Public PBLatchAbort
PBLatchAbort:
            Call    KeyEnable mov     ah,5ah                  ; Read current status
            call    CfgRead                 ; Get the value
            and     ah,20h                  ; Alarms on?
            cmp     ah,20h                  ; maybe
            jne     PBLatchAb1              ;Nop
            mov     ax,205ah
            call    CfgClearBits            ; clear alarm suspend request
            xor     cx,cx                   ; needed ???rjj
            loop    $
            mov     ax,205ah call    CfgSetBits
            xor     cx,cx
            loop    $ PBLatchAb1:                                 ;3-7-95vw
;3-8-95vw   call    Video_UnGlobal          ;3-8-95vw Restore video
            pop     cx                      ; Clean Stack off mov     al,1
            out     0e1h,al                 ; Clear Interrupt mov     ax, 0047dh              ; Clear status
            call    CfgClearBits jmp     NoActionKey
PDLatch:                                    ;Process Dock/Undock Request : bit =0
            in      al,0e0h                 ;4-28-95vw
            out     0e1h,al                 ;4-28-95vw clear interrupt
            mov     ax, 0017dh              ;4-28-95vw Clear status 3-11-95vw
Using EXTSMI0
            call    CfgClearBits            ;4-28-95vw
;
;           At this point we need to decide for Win95 if we want to
;           dock or undock via a user override feature:
;           Features are:  Nornal Dock, Warm Dock, and Hot Dock.
;
;           If normal dock, follow windows rules and go to ActionSus
;           If Warm dock, follow windows rules and go to ActionSus after
;           setting the Warm dock semifore such that the resume from Win95
;           suspend will call the PnP bios for a "Reconfig" function.
;           If Hot dock, follow the pattern for Warm dock, but set the
;           semifore to HOT to allow only the "re-enumeriation" for PnP.
;
;           Since this function relies on a semifore, that semifore was set
;           by the user in setup and the semifore is held in CMOS elimination
;           of re-reading the user request and setting a local variable.
;           The Win95 action can read the semifore directly from the user
```

-21-

```
;       CMOS location.

jmp     ActionSus               ;4-28-95vw
PPLatch:                                ;Process Powerswitch : bit = 0
        mov     al,0
        out     0e0h,al         ;Kill all interrupts
        mov     al,-1
        out     0e1h,al         ;Clr all pending ones ;       5-13-95vw
;
;       Insert the walk tables here code
;
        extrn   PowerDownTable:byte
        mov     si, offset PowerDownTable
        extrn   SubWalkTable:near
        call    SubWalkTable Public  TurnPowerOff TurnPowerOff    proc    near                    ;5-13-95vw Extrn   ExtCmosCsum:near
        Call    ExtCmosCsum turnpwroff:
        CLI                     ;Disable interrupts
        mov     al,0
        out     0e0h,al         ;Kill all interrupts
        mov     al,-1
        out     0e1h,al         ;Clr all pending ones in      al,0e2h
        and     al,NOT 4        ;Turn off Power Deadman
        out     0e2h,al         ;Done or      al,7            ;Turn on Software Control/Deadman
        out     0e2h,al         ;Done and     al,NOT 3        ;Turn off software Control
        out     0e2h,al or      al,1            ;Turn power off please
        out     0e2h,al         ;Done!
Forever:        JMP     Forever ;Spin until lost ofpower or deadman control
TurnPowerOff    endp PELatch:                        ;Process EZ-Dock com : bit =1 in      al,0e0h
        out     0e1h,al                 ;clear interrupt
        mov     ax, 0017dh              ; Clear status 3-11-95vw Using EXTSMI0
        call    CfgClearBits jmp     NoActionKey
```

```
SaveDiskAction:
        extrn   SaveToDisk:near
        call    SaveToDisk
;
;       Need to add critical resume to que iff Windows 95
;
        mov     al,0ffh
        out     0e1h,al
        ret
ELSE    ;zzzlilyp mov     ax, 0027dh              ; Clear status
        call    CfgClearBits mov     ax, 085dh               ; Disable and enable button to
        call    CfgClearBits            ; clear button suspend request xor     cx,cx                   ; needed ???rjj
        loop    $
        call    CfgSetBits bsh1:

Ifdef FFF_PNP test    ds:[PnPMiscFlags], PnPConnected ;Is PNP active
        jz      PNPnoButton                     ;No..use old handler test    ds:[PnPMiscFlags], PnPSuspendReq
                                        ; If PnP request already pending
                                        ; ignore this one
        jnz     suspenddone             ; return to dispatcher or      ds:[PnPMiscFlags], PnPSuspendReq mov     ds:[SWSMILoopCount], PNPSWSusloops
                                        ; Set the loop count
        push    cs
        push    offset suspenddone      ; Prepare return address mov     ax, 0f000h              ; BIOS segment
        mov     es,ax
        mov     eax, dword ptr es:[pnpHeaderOffset.FarEntry2PnP]
        push    eax                     ; Prepare far address to
        xor     eax, eax                ; execute miser_suspend (fn 0)
        retf                            ; Far jump to miser_suspend
                                        ; which will return here
PNPnoButton:

Endif   ; FFF_PNP call    APMSuspendNotify        ; proceed to notify APM of SRBTN suspenddone:

ret                             ; return to dispatcher
```

-23-

```
ENDIF    ;zzzlilyp
;
; LBAT1 REQUEST HANDLER
;
LBAT1Handler:
IFDEF    zzzlilyp                        ;Treport C4 for LBAT1 2-1-95vw
         TREPORT         0C4H            ;
;---------------------------------------------------------------------
;
Public   LBAT1Handler                    ;Add to RMAP for debug entry
         extrn   APMBattLowNotify:near
         mov     ax, 0047dh              ; Clear status
         call    CfgClearBits
         mov     ah,5ah                  ; Read current status
         call    CfgRead                 ; Get the value
         and     ah,20h                  ; Alarms on?
         cmp     ah,20h                  ; maybe
         jne     Lbatalreadyoff          ;Nop
         mov     ax,205ah
         call    CfgClearBits            ; clear alarm suspend request
         xor     cx,cx                   ; needed ???rjj
         loop    $
         mov     ax,205ah call    CfgSetBits
         xor     cx,cx
         loop    $ Lbatalreadyoff:                          ;3-7-95vw
;
;        Get the interrupt
;
         mov     ah,3                    ;Cover closed/Low Bat int to clr.
         out     0e1h,al                 ;Clr cover closed / Lbat interrupt
         ret ELSE     ;zzzlilyp

DPORTNWNS       0ACH mov     ax, 0047dh              ; Clear status
         call    CfgClearBits
         ret
ENDIF    ;zzzlilyp
;
; Software SMI
;
SoftSMIHandler:
;4-5     JMP     $                       ;4-5-95vw
;        TREPORT         0ADH mov     ebx,dword ptr ds:[EBXIMAGE]
         TREPORT bl                      ;dump bl cause code mov     ax, 0085ah              ; Clear software smi trigger
         call    CfgClearBits mov     ax, 0087dh              ; Clear status
```

```
             call     CfgClearBits
IFDEF   zzzlilyp                                   ;Delete PnP
ELSE    ;zzzlilyp
Ifdef FFF_PNP
             cmp      ds:[SWSMILoopCount],0        ;part of a sw smi loop
             jz       nonloopSMI                   ;no..use old handler test     ds:[PnPMiscFlags], PnPConnected ;Is PNP active
             jz       PNPnoSWSMI                   ;No..use non pnp handler push     es
             mov      ax,40h
             mov      es,ax                        ;get pnp event byte
             mov      al,byte ptr es:[pnp_event_status_offset]
             pop      es test     al,80h                       ;message?
             jz       decswtmr                     ;..no continue test     al,40h                       ;negative response
             jz       cancelswtmr                  ;..kill loop call     APMSuspendNotify             ;else suspend push     cs
             push     offset cancelswtmr
                                                   ; Prepare address of return
point
             mov      ax, 0f000h                   ; BIOS segment
             mov      es, ax
             mov      eax, dword ptr es:[pnpHeaderOffset.FarEntry2PnP]
             push     eax
             mov      ah, 1                        ; Function 1 MiserResume
             retf                                  ; Far call decswtmr:
             dec      ds:[SWSMILoopCount]          ;decrement loopcount
             jnz      softdone                     ;if not zero continue
                                                   ;else cancel timer
cancelswtmr:
             and      ds:[PnPMiscFlags], not PnPSuspendreq  ;Cancel request
             mov      ds:[SWSMILoopCount],0        ;and loopcount PNPnoSWSMI:
             jmp      short Softdone nonloopSMI:
Endif   ; FFF_PNP
ENDIF   ;zzzlilyp ; Dont use RET, because for Intel cpu we use far call to jump to service
; routine, but that routine just come back with near return, and the RET will
; get the segment address which pushed into stack by far call as return
```

```
; address, so system hung.
;
        mov     ebx,dword ptr ds:[EBXIMAGE]

ifdef   FFF_APM_1_1
ifdef   FFF_APMSoftSMI
        cmp     bl,MaxSysSoftSMI
        jb      normalswsmi
        call    APMSoftDisp
        jmp     softdone
endif   ;FFF_APMSoftSMI
endif   ;FFF_APM_1_1 normalswsmi:
IFDEF   zzzlilyp                                            ;2-24-95tpl Support
PnP soft smi
        cmp     bl,4
        ja      softdone
        jb      trysoft3
        call    dword ptr ds:[EDXIMAGE] ;Call SSMI handler.
        jmp     short softdone
trysoft3:
ENDIF   ;zzzlilyp
        cmp     bl,3
        ja      softdone
        jb      trysoft2
        call    dword ptr ds:[ECXIMAGE] ;Call SSMI handler.
IFDEF   zzzlilyp                                            ;2-24-95vw lost jmp
from Phoenix
        jmp     softdone
ENDIF   ;zzzlilyp
trysoft2:
        cmp     bl,2
        jb      trysoft1
        call    EnterSuspend
        jmp     softdone trysoft1:
        cmp     bl,1
        jb      softdone
        call    EnterStandby softdone:

jmp     TranslateExit
IFDEF   zzzlilyp                    ;Nop the r/s key interrupt 3-12-95vw
;
; Suspend/Resume Interrupt not used
;
SuspendResumeKey:
        DPORTNWNS       0AEH mov     ax, 0027dh          ; Clear status
        call    CfgClearBits
        ret
ENDIF   ;zzzlilyp
IFDEF   zzzlilyp                    ;Delete commented code 3-17-95vw
```

```
ELSE    ;zzzlilyp
COMMENT *  Next commented portion may be used for multifunctional extSMI0
;hunc B
        mov     al, 6ah         ;hunc
        call    cmosread
        cmp     ah, 0
        jne     short @f
        call    SetItsPopupSetup
        call    EnterPopup
        ret @@:     cmp     ah, 1
        jne     short @f
        call    APMStandbyNotify
        ret @@:     cmp     ah, 2
        jne     short @f
        call    APMSuspendNotify
        ret @@:     cmp     ah, 3
        jne     short @f
        extrn   SaveToDisk:near
        jmp     SaveToDisk @@:     ret
*
;hunc E ;       extrn   SaveToDisk:near
;       jmp     SaveToDisk ;
; See csapmi.asm
; If Ext0 is routed from one of the power control pin then following code
; should be considered.
;
;       mov     ah, ds:[Ext1_0Timer]    ; Restore Ext0 timer
;       and     ah, 0fh                 ; Ext0 is bit 3-0
;       mov     al, 07eh
;       mov     bl, 0fh
;       call    CfgWriteMask
;
;       mov     al, CM_DOZESOURCE
;       call    CmosRead
;       cmp     ah, CM_DOZESOURCE_STANDBY
;       jne     short @f
;       call    GlobalRequest
;       jmp     short ExitSMI0
;@@:    cmp     ah, CM_DOZESOURCE_SUSPEND
;       jne     short @f
;       call    SuspendRequest
;       jmp     short ExitSMI0
;@@:
;ExitSMI0:
;       ret
ENDIF   ;zzzlilyp
```

```
;
; External SMI 1
;
ExternalSMI1:

IFDEF       zzzlilyp
            TREPORT         7ah
ELSE        ;zzzlilyp
            DPORTNWNS       0AFH
ENDIF       ;zzzlilyp mov     ax, 0207dh          ; Clear status
            call    CfgClearBits
            ret ;
; AC power low to high
;
AClow2high:
            DPORTNWNS       0B0H mov     ax, 0407dh          ; Clear status
            call    CfgClearBits
            ret ;
; AC power high to low
;
AChigh2low:
            DPORTNWNS       0B1H mov     ax, 0807dh          ; Clear status
            call    CfgClearBits
            ret ;
; Null SMI
;
NullSMI:
            DPORTNWNS       0B0H
            ret ;
; Reset STATUS register for next IRQ
;
            public  ResetStatusReg
ResetStatusReg  proc    near
            mov     ax, 0805ah          ; Diassert smi signal
            call    CfgSetBits
            call    CfgClearBits
            ret
ResetStatusReg  endp ;
; Issue a SMI to enter SMI state
;
            public  EnterSMI
EnterSMI        proc    near
```

```
Ifdef FFF_PNP
        mov     ax, 0f47fh              ; Clear time-out period of software
                                        ; timer call    CfgClearBits
EnterPnPSMI:
Endif   ; FFF_PNP mov     ax, 04059h              ; Enable software smi
        call    CfgSetBits mov     ax, 035ah               ; Trigger software smi
        call    CfgSetBits ;       TREPORT 0b4h
;
;       mov     al, 5ah                 ; Assert smi
;       out     0f2h, al
;       in      al, 0f3h
;       or      al, 03h
;       out     0f3h, al
;
;       nop                             ; Wait smi issued
;       nop
;       nop
;       nop
;       nop
;       nop
;       nop
;       nop
;       nop
;       nop
;       nop
;       nop ret
EnterSMI        endp ;
        public  SSMISetup
SSMISetup       proc    near
        mov     cx, PMAN_SEGMENT        ; 0ea00h
        shl     ecx, 16                 ; make SSMI segment
        mov     cx, offset EnterPopUp   ; make SSMI offset
        call    EnterSMI
        ret
SSMISetup       endp
;
; StateInit - Initialize System State Manager.
;
; Entry:
;       Nothing
; Exit:
;       Nothing
;
        Public  StateInit
```

```
StateInit proc near
        push    bx
;       mov     DozeTO,0
;       mov     SleepTO,0
;       mov     SuspendTO,0
        mov     PmEnabled,1
        call    InitTimeouts            ;Initialize Timer Register.
        pop     bx
        ret
StateInit endp InitTimeouts proc near
        push    ax
        push    bx
        push    dx ;init doze sleep and suspend timeouts from values stored in data varaiables
;rjj
IFDEF   zzzlilyp                        ;initialize CMOS states 2-24-95vw
;
;
        mov     ax,00039h               ;Free channel
        mov     bl,80h
        Extrn   CmosWriteMask:near      ;4-6-95vw 4-40
        call    CmosWriteMask mov     ax,0083ah               ;Downcount 1 time for temperature
        call    CmosWrite               ;Range for temperature initialized
;Beta 4-42 Reset Max power to 7 for insurance  4-12-95vw
;Was mov ax,00038h and mov bl,88h .. changed for lower nibble 4-12-95vw mov     ax,00738h               ;Clr Init flag for bpro, set max=7
        mov     bl,8fh                  ;Clr .WAV active/Crit warn 3-3-95vw
        extrn   CmosWriteMask:near
        call    CmosWriteMask
        mov     ax,0002eh               ;Clr scratch reg
        call    CfgWrite ;
;       Now do the dirty deed; set it up
;
        extrn   UpDateTemperature:near
        call    UpDateTemperature       ;
        mov     al,3ah                  ; Update time to scan temperature
        mov     bl,00111000b            ; Mask to write
        mov     ah,00001000b            ; One minute to pass before update
        call    CmosWriteMask           ; Done ;2-24-95vw      call    UpdateBatteryStatus     ;Later when written.
ENDIF   ;zzzlilyp @@:     pop     dx
        pop     bx
        pop     ax
        ret
InitTimeouts endp
```

```
;
; IsPmEnabled - PM Enabled Check.
;
; Entry:
;       Nothing
; Exit:
;       Carry set if PM Enabled.
;

IsPmEnabled proc near
        cmp     PmEnabled,1         ;PM Enabled?
        je      short PmOn          ;Yes.
        jb      short PmOff         ;No.

;do other checking if variable is above 1

PmOff:  clc
        ret
PmOn:   stc
        ret
IsPmEnabled endp

CODEEND
end
```

What is claimed is:

1. A method for connecting a computing device to an option communicably linked to a plurality of peripheral components, comprising the steps of:

initiating connection of an electrical connector on said computing device to an electrical connector on said peripheral option;

generating a system interrupt signal in said computing device in response to said initial electrical connection;

detecting said system interrupt signal in said computing device;

suspending activity on a bus, within said computing device, coupled to said connector on said computing device;

detecting said initial electrical connection in said option;

completing said connection of said electrical connector on said computing device to said electrical connector on said option; and restoring said activity on said bus.

2. The method as recited in claim 1, wherein said detecting said initial electrical connection in said option is performed by a controller connected to said connector on said option.

3. The method as recited in claim 2, wherein said controller applies said power to said plurality of peripheral components.

4. The method as recited in claim 1 further including the steps of:

resetting said plurality of peripheral components;

determining which of said plurality of peripheral components are active;

making a device assignment for each active peripheral component; and reconfiguring a system resource configuration to reflect said device assignment.

5. The method as recited in claim 4 further including the step of said computing device performing reallocation and re-assignment when one or more of said peripheral components are unlinked.

6. The method as recited in claim 2 wherein said step of making a device assignment for each active peripheral component includes assigning a plurality of port and interrupt designations.

7. The method as recited in claim 6 further including the step of said computing device performing reallocation and re-assignment when one or more of said peripheral components are unlinked.

8. The method as recited in claim 1 wherein said interrupt signal is generated on a dedicated set of pins on said electrical connector on said computing device.

9. The method as recited in claim 4 wherein said computing device communicates with said plurality of peripheral components via a peripheral component interface based bus architecture.

10. The method as recited in claim 4, wherein said communicating device communicates with said plurality of peripheral components via an interface based bus architecture.

11. A method for interfacing a computer to an expansion base having peripherals maintained in a powered-down state prior to said interfacing, comprising the steps of:

inserting said portable computer into said expansion base unit;

initiating a physical connection between said computer and said expansion base unit without employing buffers, on at least signal lines on the peripheral option side of said physical connection, to prevent data corruption;

generating an interrupt signal in said portable computer in response to said initial physical connection;

detecting said interrupt signal interrupt signal in said computer;

suspending activity on a plurality of signal pathways in said computer connected to the computer side of said physical connection;

completing said physical connection between said computer and said expansion base unit;

thereafter applying power to said plurality of peripheral devices communicably linked to said expansion base unit; and restoring activity on said plurality of signal pathways.

12. The method as recited in claim 11 wherein said portable computer and said expansion base unit are in equivalent power states.

13. The method as recited in claim 11 wherein said portable computer and said expansion base unit are in different power states.

14. The method as recited in claim 11 wherein said plurality of signal pathways support a peripheral component interface standard.

15. The method as recited in claim 11 wherein said plurality of signal pathways support an interface standard.

16. The method as recited in claim 11 further including the steps of:

resetting each of said plurality of peripheral devices to a native operational mode;

determining which of each said plurality of peripheral devices are active; and updating a resource configuration within said portable computer.

17. The method as recited in claim 16 wherein said step of updating said resource configuration within said computer further includes assigning a plurality of port and interrupt designation to each active peripheral device.

18. A method for interfacing a computer system to an expansion base unit having a docking bay, wherein said computer system and said expansion base unit are in equivalent or different power states and wherein said expansion base unit is communicably attached to a plurality of peripheral devices maintained in a powered-down state prior to said interfacing, said method comprising the steps of:

associating said computer system with said docking bay;

initiating a connection between a plurality of signal pathways in said computer terminating in a first connector on said computer system and a plurality of signal pathways terminating in a second connector on said expansion base unit;

detecting in said computer system an interrupt signal generated by the initial connection of said first connector and said second connector;

checking status of at least one of said plurality of signal pathways in said computer system;

suspending activity along said plurality of signal pathways in said computer system;

detecting in said expansion base unit said initial connection of said first connector and said second connector;

applying power to said plurality of peripheral components;

completing said connection between said computer system and said expansion base unit; and restoring activity on said plurality of signal pathways.

19. The method as recited in claim 18 further including the steps of:
   resetting each of said plurality of peripheral devices to a native operational mode;
   determining which of each said plurality of peripheral devices are active; and
   updating a resource configuration within said computer system.

20. The method as recited in claim 18 wherein said connection between said portable computer system and said expansion base unit is accomplished using a set of contacts.

21. The method as recited in claim 19 wherein said step of updating said resource configuration within said portable computer system further includes assigning a plurality of port and interrupt designations to each active peripheral device.

22. The method as recited in claim 19 wherein said determining step is implemented within a peripheral component interface ("PCI") based bus architecture.

23. The method as recited in claim 19 wherein said determining step is implemented within a standards based bus architecture.

24. The method as recited in claim 22 wherein said computer system suspends activity along said PCI based bus architecture once said interrupt signal is detected.

25. The method as recited in claim 22 wherein said computer system suspends activity along said PCI based bus architecture for a time once said interrupt signal is detected.

26. A computer/peripheral option system, comprising:
   a computer having a processor and a plurality of signal pathways coupling said processor to a connector on said computer;
   a peripheral option having a controller coupling a connector on said peripheral option to a plurality of peripheral components;
   a means within said computer for detecting an interrupt signal generated by an initial coupling of said connector on said computer to said connector on said peripheral option;
   a means within said computer for suspending activity on said plurality of signal pathways upon detection of said interrupt signal;
   a means within said peripheral option for detecting said initial coupling of said connector on said computer to said connector on said peripheral option;
   a means within said peripheral option for applying power to said plurality of peripheral components upon detection of said initial coupling of said connector on said computer to said connector on said peripheral option; and
   means for restoring activity on said plurality of signal pathways in response to a complete coupling of said connector on said computer to said connector on said peripheral option.

27. The system of claim 26, further including a system configuration program within said portable computer for identifying, via said controller, said peripheral component assignments.

28. The system of claim 26, wherein said system configuration program comprises a Basic Input Output System setup routine for enabling proper communications between said computer and said plurality of peripheral devices.

29. The system of claim 26, wherein said plurality of signal paths support a peripheral component interface standard.

30. The system of claim 26, wherein a controller is said means within said peripheral option for applying power to said plurality of peripheral components upon detection of said initial coupling of said connector on said computer to said connector on said peripheral option.

31. The system of claim 26, wherein said processor restores said activity on said plurality of signal pathways in response to a complete coupling of said connector on said computer to said connector on said peripheral option.

32. A method for interfacing a computer to an expansion base unit, comprising the steps of:
   inserting said portable computer into said expansion base unit;
   initiating a physical connection between said computer and said expansion base unit;
   generating an interrupt signal in said portable computer in response to said initial physical connection;
   detecting said interrupt signal interrupt signal in said computer;
   suspending activity on a plurality of signal pathways in said computer connected to the computer side of said physical connection;
   completing said physical connection between said computer and said expansion base unit;
   thereafter applying power to said plurality of peripheral devices communicably linked to said expansion base unit; and
   restoring activity on said plurality of signal pathways.

33. A computer/peripheral option system, comprising:
   a computer having a processor and a plurality of signal pathways coupling said processor to a connector on said computer;
   a peripheral option having a controller coupling a connector on said peripheral option to a plurality of peripheral components;
   a means within said computer for detecting an interrupt signal generated by an initial coupling of said connector on said computer to said connector on said peripheral option;
   a means within said computer for suspending activity on said plurality of signal pathways upon detection of said interrupt signal;
   a means within said peripheral option for detecting said initial coupling of said connector on said computer to said connector on said peripheral option; and
   means for restoring activity on said plurality of signal pathways in response to a complete coupling of said connector on said portable computer to said connector on said peripheral option.

* * * * *